United States Patent
Backhaus

(10) Patent No.: US 8,145,495 B2
(45) Date of Patent: Mar. 27, 2012

(54) INTEGRATED VOICE NAVIGATION SYSTEM AND METHOD

(75) Inventor: George Backhaus, Suwanee, GA (US)

(73) Assignee: Movius Interactive Corporation, Johns Creek, GA (US)

( * ) Notice: Subject to any disclaimer, the term of this patent is extended or adjusted under 35 U.S.C. 154(b) by 0 days.

(21) Appl. No.: 12/766,129

(22) Filed: Apr. 23, 2010

(65) Prior Publication Data

US 2010/0202598 A1    Aug. 12, 2010

Related U.S. Application Data

(63) Continuation of application No. 10/244,648, filed on Sep. 16, 2002, now Pat. No. 7,797,159.

(51) Int. Cl.
*G10L 11/00* (2006.01)
*G10L 21/00* (2006.01)

(52) U.S. Cl. .......... 704/275; 704/270; 704/270.1

(58) Field of Classification Search .......... 704/270, 704/270.1, 275

See application file for complete search history.

(56) References Cited

U.S. PATENT DOCUMENTS

| 5,202,952 | A | * | 4/1993 | Gillick et al. | 704/200 |
|---|---|---|---|---|---|
| 6,078,886 | A | * | 6/2000 | Dragosh et al. | 704/270 |
| 6,327,568 | B1 | * | 12/2001 | Joost | 704/270.1 |
| 6,418,199 | B1 | * | 7/2002 | Perrone | 379/88.01 |
| 6,539,078 | B1 | * | 3/2003 | Hunt et al. | 379/88.04 |
| 6,584,439 | B1 | * | 6/2003 | Geilhufe et al. | 704/270 |
| 2001/0016814 | A1 | * | 8/2001 | Hauenstein | 704/231 |
| 2002/0055844 | A1 | * | 5/2002 | L'Esperance et al. | 704/260 |
| 2002/0072914 | A1 | * | 6/2002 | Alshawi et al. | 704/270.1 |

* cited by examiner

*Primary Examiner* — Eric Yen
(74) *Attorney, Agent, or Firm* — Smith Risley Tempel Santos LLC; Gregory Scott Smith

(57) ABSTRACT

An integrated voice navigation system 40 is disclosed. The voice navigation system (40) includes a voice messaging system (44), a speech recognition system (46), a voice channel (50) and a control link (52). A caller is connected to the voice messaging system (44) via PSTN (42). The voice messaging system (44) is in turn connected to the speech recognition system (46). Specifically, the voice messaging system (44) and speech recognition system (46) are connected via both the voice channel (50) and the control link (52). The voice channel (50) provides an audio communications pathway between the caller and the speech recognition system (46), while the control link (52) provides an out-of-band communications pathway between the voice messaging system (44) and the speech recognition system (46).

5 Claims, 7 Drawing Sheets

INTEGRATED VOICE NAVIGATION SYSTEM AND METHOD

CROSS-REFERENCE TO RELATED APPLICATIONS

This application is a continuation of the U.S. patent application filed on Sep. 16, 2002 and assigned Ser. No. 10/244,648 now U.S. Pat. No. 7,797,159, the entirety of which is incorporated by reference.

FIELD OF THE INVENTION

The present invention generally relates to voice messaging systems and, more specifically, to a voice-controlled, voice messaging system that does not require the generation of DTMF tones in response to voice commands.

BACKGROUND

Voice messaging systems (VMSs) have become well known in recent years. Such

VMSs have been developed to implement various communications-related applications, among other things. In a typical application when a caller reaches a conventional VMS, a series of multilevel menus and prompts are often played to the caller. The menus and prompts invite the caller's responsive entry of a sequence of Dual-Tone Multi-Frequency (DTMF) tones, or touchtones, to navigate the various menu levels. The DTMF tones are generated by pressing buttons on the caller's telephone keypad. The conventional VMS is designed to receive and process the DTMF tones provided by the caller to implement desired voice messaging features. However, under certain circumstances, it may be inconvenient or even dangerous for a caller to focus their attention on a keypad. For example, in a wireless telephone environment where a caller is driving or walking while on the telephone, requiring the caller to select an option from a set of DTMF keys could result in an accident or difficult situation.

To address this problem, current VMSs provide for hand-free interaction with callers by utilizing speech recognition platforms, also referred to as voice response units, which interpret speech from the callers and provide the appropriate DTMF tones to the VMS. More specifically, as depicted in the prior art architecture shown in FIG. 1, a conventional speech recognition platform 20 recognizes and receives a caller's voice commands, which the caller could have alternatively entered through the provision of an appropriate sequence of DTMF tones. Upon receipt of a voice command, the speech recognition platform 20 generates an associated sequence of DTMF tones that correspond to the voice command. This sequence is then provided to a VMS 24, as if the caller himself had provided the DTMF tones. In this way, the conventional speech recognition platform 20 simply imitates a caller's DTMF keypresses. The VMS 24 has no knowledge of the function that the speech recognition platform 20 performed. Rather, the VMS 24 simply detects the DTMF tones and reacts as if the caller is pressing keys.

As an example, assume that a subscriber to the VMS 24 dials into his account in the VMS 24 wanting to change the outgoing greeting played to persons trying to reach him. To do so without the use of the speech recognition platform 20, the subscriber must navigate a multilevel menu structure by providing DTMF tones at the appropriate time. In response to a host of menu options, depending on the particular design of the menu structure, the subscriber would, for example, first press "2" on the telephone keypad to access a "greetings and names" menu. Second, the caller would, for example, press "2" on the telephone keypad to select greeting options, instead of name options. Third, the subscriber would, for example, press "3" to indicate an intention to re-record the greeting.

However, where the speech recognition platform 20 is utilized in front of the VMS 24, the architecture provides for the use of voice commands by a caller. In such a case, the speech recognition platform 20 would first recognize and process the subscriber's voice command to change the greeting. Following the example above, this speech recognition platform 20 would then provide to the VMS 24 the sequence of DTMF tones that correspond to the depression of the "2," "2," and "3" keys. The DTMF tones would be provided in rapid succession. As a result, a menu prompted by a particular DTMF tone, and otherwise played in its entirety to the subscriber, would be cut short by the provision of the next DTMF tone. In this regard, a series of aborted audio feedback would be played to the subscriber, presenting a nonintegrated "look and feel" to the subscriber.

In other cases, some VMSs that provide speech-based interaction simply implement a speech user interface having an identical or essentially identical menu hierarchy as a conventional DTMF user interface. Systems that implement a speech user interface in this manner are undesirable because they fail to reduce voice messaging system interaction complexity.

Therefore, in light of the above problems, there is a need for a new system architecture that reduces voice messaging system interaction complexity; presents an integrated "look and feel" appearance to a caller or subscriber; dispenses with the need to generate DTMF tones in response to voice commands; and does not use existing DTMF keypad-based platforms for voice messaging.

BRIEF SUMMARY

The present invention is directed to a system and method that addresses the above-identified problems by integrating a voice messaging system with a speech recognition system and providing for the out-of-band transfer of information therebetween.

The voice-navigable messaging system of the present invention includes a voice messaging system and a speech recognition system which are connected by a control link over a local area network (LAN), as well as by a voice channel over a T1 line for example. The voice messaging system is connected with a caller via a Public Switched Telephone Network (PSTN) and communicates with the speech recognition system via the control link by using an out-of-band messaging protocol to exchange messages necessary for managing the connection therebetween. The voice messaging system utilizes the speech recognition system to, at a minimum, receive and interpret a caller's voice commands.

In one embodiment, the voice messaging system includes a voice-navigable messaging application which is optimized for voice control. Pursuant to this optimized voice-navigable messaging application, the voice messaging system controls the entire processing of a call and utilizes the speech recognition system as it resource. In particular, upon receiving an incoming call, the voice messaging system sends at least one out-of-band protocol message to the speech recognition system via the control link requesting the speech recognition system to open the voice channel and to be prepared to receive a spoken response from the caller and identify the application state. In the meantime, the voice messaging system provides an audio prompt to the caller eliciting a spoken response and opens the voice channel between the voice messaging system and speech recognition system so that the speech recognition system can receive the spoken response. Pursuant to the at least one out-of-band protocol message from the voice messaging system providing the call setup information and request for identification of application state, the speech recognition system receives and interprets the spoken response from the caller. Interpreting the spoken response involves correlating the caller's response with a command recognizable by the voice messaging system. In return, the speech recognition system sends an out-of-band protocol message back to the voice messaging system via the control link identifying the command indicated by the spoken response. The voice messaging system 44 then continues processing the call in accordance with the received command and utilizes the speech recognition system 46 as needed to further interpret a caller's speech.

In another embodiment, the voice messaging system initially controls the processing of a call, but thereafter passes control to the speech recognition system. More specifically, the voice messaging system receives an incoming call and connects the caller to the speech recognition system via the voice channel pursuant to at least one out-of-band message sent over the control link. The voice messaging system then passes control to the speech recognition system. Pursuant to a separate voice-navigable messaging application stored and running on the speech recognition system, the speech recognition system takes over control of the processing of the call by providing one or more audio prompts to the caller via the voice channel, receiving a spoken response elicited by the one or more audio prompts over the voice channel, interpreting the spoken response, and performing at least one task in accordance with the interpreted response. The speech recognition system sends out-of-band protocol messages to the voice messaging system via the control link during processing of the call in order to retrieve, store, or delete a message, greeting, or spoken subscriber name. After passing control to the speech recognition system, the voice messaging system is primarily used for maintaining the subscriber database and also for maintaining the telephony interface with the PSTN. It will be appreciated by those skilled in the art and others that in this embodiment the speech recognition system is operable to serve many voice messaging systems.

BRIEF DESCRIPTION OF THE SEVERAL VIEWS OF THE DRAWING

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a system and method of providing voice-controlled navigation of a voice messaging system. In general, this invention provides for the out-of-band transfer of information between a voice messaging system and a speech recognition system. In this regard, a unique communications protocol is provided that allows not only for the exchange of speech between a voice messaging system and a speech recognition system, but also for the exchange of messages necessary for managing the interconnection between the voice messaging system and speech recognition system. Furthermore, this invention uses out-of-band messages including commands specifically designed for a voice-activated interface, such that a single spoken command replaces the use of a series of keypad-based commands. Hence, existing menu structures are "flattened," thereby creating a user interface that is easier to use because it is optimized for voice control.

Figure 1:
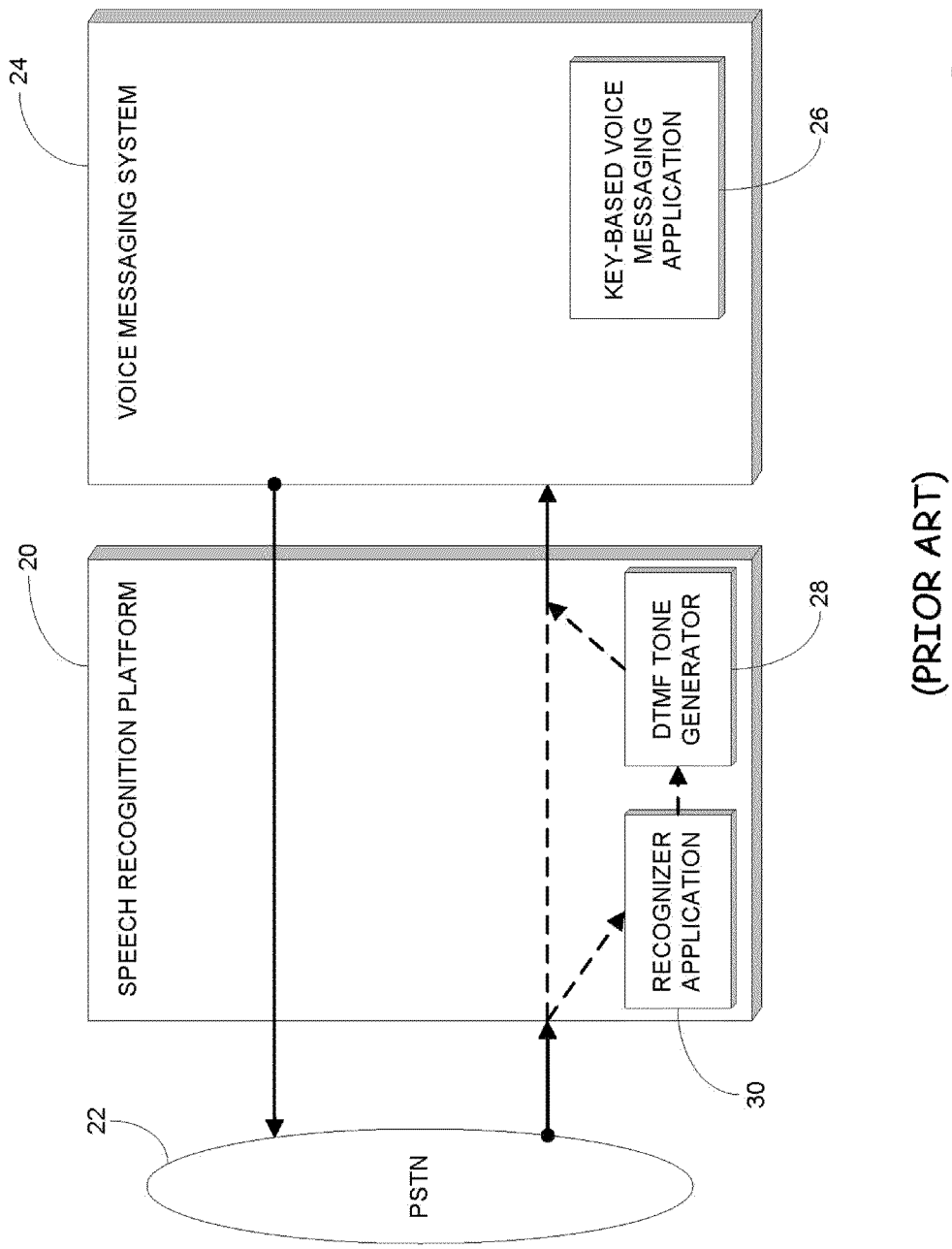
FIG. 1 is a block diagram illustrating a prior art architecture for handling speech-based commands in connection with a conventional voice messaging system.
Figure 2:
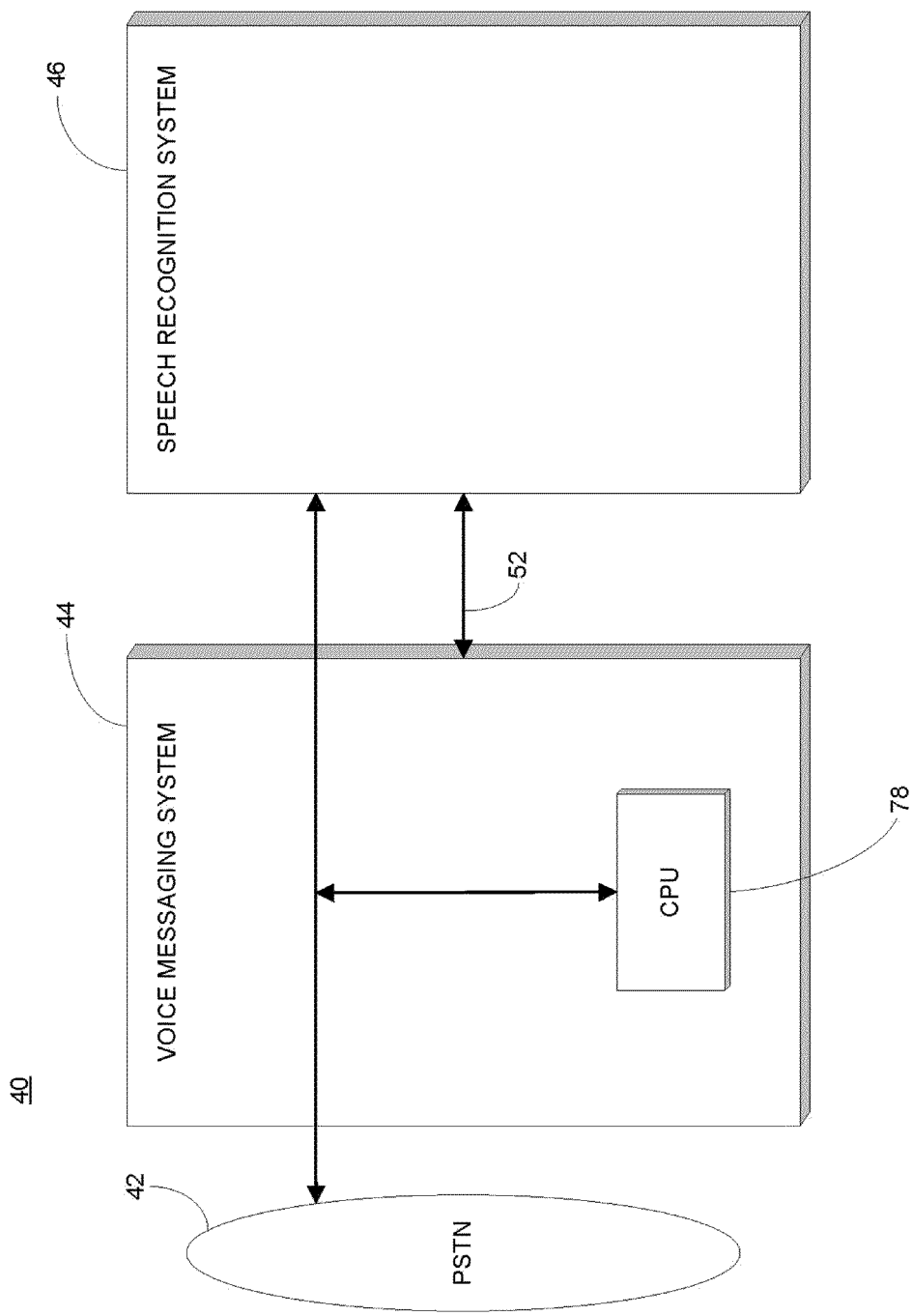
FIG. 2 is a block diagram illustrating the basic architecture of the system of the present invention.

FIG. 2 illustrates the main components of an integrated voice navigation system 40 formed in accordance with the present invention. The voice navigation system 40 includes a voice messaging system 44 and a speech recognition system 46. A caller is connected to the voice messaging system 44 via PSTN 42. The voice messaging system 44 is in turn connected to the speech recognition system 46. Specifically, the voice messaging system 44 and speech recognition system 46 are connected via a voice channel 50, which is a T1 line for example, and a control link 52 over a local area network (LAN). The voice messaging system 44 includes a voice messaging processor which is preferably manufactured by Glenayre Electronics, Inc. under the trademark MVP®. Also preferred is the voice messaging processor manufactured by Glenayre Electronics under the trademark GL3000.

In general, in reference to FIG. 2, the voice messaging system 44 and speech recognition system 46 work together in an integrated fashion. In one embodiment, the voice messaging system 44 includes an optimized voice-navigable messaging application 58 pursuant to which the voice messaging system 44 controls the processing of a call. The voice messaging system 44 opens and selectively accesses the voice channel 50 between the voice messaging system 44 and speech recognition system 46 when speech recognition is required. Specifically, the voice messaging system 44 requests via an out-of-band messaging protocol via control link 52 that the speech recognition system 46 open the voice channel 50 and listen for and interpret a caller's spoken response provided over the voice channel 50. The speech recognition system 46 then provides at least one return out-of-band message to the voice messaging system 44 via control link 52 indicating the command corresponding to the caller's response. The voice messaging system 44 then continues processing the call in accordance with the interpreted command and utilizes the speech recognition system 46 as needed.

In another embodiment, a call still comes in through the voice messaging system 44, but instead is controlled via the speech recognition system 46. In this case, the speech recognition system 46 communicates with the caller through the voice channel 50 between the speech recognition system 46 and voice messaging system 44, and uses the voice messaging system 44 simply as a switch and a data storage and retrieval device. Specifically, as will be further described below, the speech recognition system 46 controls the processing of the call pursuant to a separate voice-navigable messaging application stored and running thereon and sends out-of-band messages to the voice messaging system 44 via control link 52 as needed to request the storage, retrieval, or deletion of a message, greeting, or spoken subscriber name.

Figure 3:
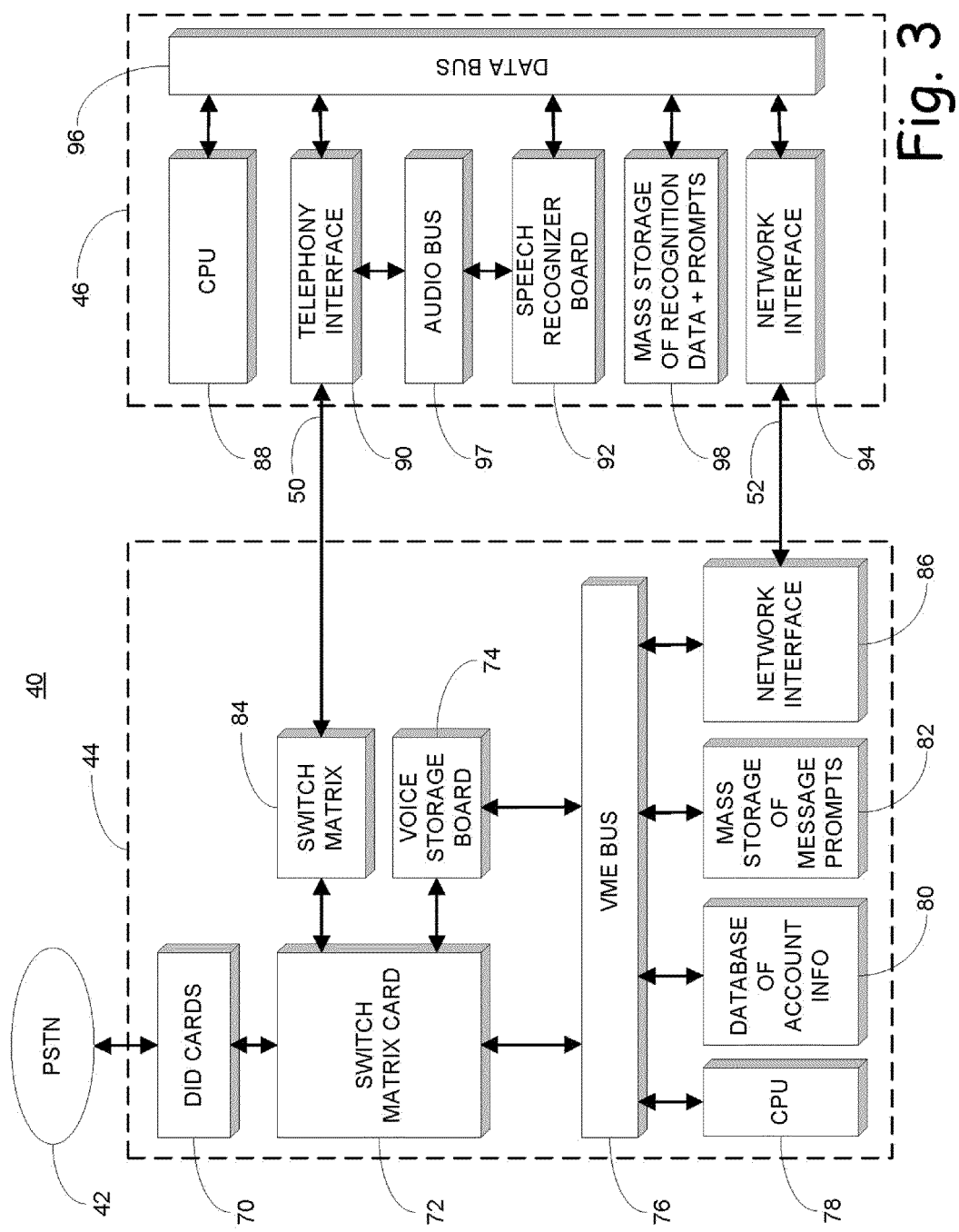
FIG. 3 is a detailed schematic diagram of a voice messaging system and speech recognition system formed in accordance with the present invention.

FIG. 3 illustrates a more detailed schematic diagram of the voice navigation system 40, and specifically the voice messaging system 44 and the speech recognition system 46. As mentioned above, the preferred voice messaging system 44 includes at least one voice messaging processor, the detailed structure of which is described in U.S. Pat. No. 5,657,376 assigned to Glenayre Electronics, Inc., the disclosure of which is hereby incorporated by reference.

As shown in FIG. 3, the voice messaging system 44 includes a plurality of direct inward dial (DID) cards 70 that function as the interface between the voice messaging system 44 and the PSTN 42. The PSTN 42 is connected to the DID cards, for example, via a T1 line. The voice messaging system 44 also has at least one voice storage board (VSB) 74 that serves as a temporary buffer to store voice messages for replay out to the system subscribers through the DID cards 70. The VSB 74 also contains a number of set, pre-recorded voice messages, such as greetings, system instructions, and/or system state announcements that are selectively played to the callers or the system subscribers.

The overall operation of the voice messaging system 44 is controlled by a central processing unit (CPU) 78. In one embodiment, as will be further described below, the CPU 78 includes a memory for storing an optimized voice-navigable messaging application 58 and a microprocessor on which this application runs. A database 80 serves as the memory that contains information, such as a subscriber record, for each subscriber, which lists the services that the subscriber uses. A hard drive 82 functions as the memory in which voice messages left for the subscriber are stored, as well as the storage for voice mail application prompts.

Digitized audio signals, including voice signals, are transferred between the DID cards 70 and VSB 74 over a pulse code modulation (PCM) highway. A switch matrix 72 regulates the flow of data over the PCM highway pursuant to instructions generated by the CPU 78. The CPU 78, database 80, hard drive 82, VSB 74 and switch matrix 72 are connected by a common communications pathway, referred to as the VME bus 76.

As further shown in FIG. 3, the speech recognition system 46 includes a central processing unit (CPU) 88, speech recognizer board 92 and a mass storage device 98, which are all connected by a Data bus 96. The CPU 88 includes a memory in which a speech recognition application is stored and a microprocessor on which this application runs. In one embodiment, where the speech recognition system 46 controls the processing of a call, as will be further described below, the memory of CPU 88 also includes a separate voice-navigable messaging application.

As mentioned above, the voice messaging system 44 and speech recognition system 46 are connected via a voice channel 50 and via a control link 52. Specifically, as shown in FIG. 3, the voice channel 50 is established between a switch matrix 84 of the voice messaging system 44 and a telephony interface 90 of the speech recognition system. The switch matrix 84 is connected to the switch matrix card 72, while the telephony interface 90 is connected to data bus 96 and to the speech recognizer board 92 via an audio bus 97. The control link 52 is established between a network interface 86 of the voice messaging system 44 and a network interface 94 of the speech recognition system 46.

In reference to FIG. 3 and as mentioned above, the voice messaging system 44 and speech recognition system 46 work together in an integrated fashion. In a first embodiment, the voice messaging system 44 answers a call and brings in the speech recognition system 46 essentially as a resource which the voice messaging system 44 manages and controls. Hence, voice channel 50 between the voice messaging system 44 and speech recognition system 46 is established and selectively accessed only when speech recognition is required. In this embodiment, the voice messaging system 44 controls the processing of the call via an optimized voice-navigable messaging application 58 running on CPU 78.

In particular, a call comes into the voice messaging system 44 from PSTN 42 via a DID card 70. If CPU 78 determines that the call is to a "valid" subscriber number, the DID card 70 is instructed to establish a connection to the caller. The CPU 78 also instructs network interface 86 to establish control link 52 with the network interface 94 of the speech recognition system 46 such that call setup and application state information can be provided and such that application state control messages can thereafter be exchanged. Specifically, the CPU 78 initially sends at least one out-of-band (TCP/IP, etc.) protocol message to the speech recognition system 46 via control link 52 instructing the speech recognition system 46 to open the voice channel 50 and be prepared to receive speech from the caller at telephony interface 90 via the voice channel 50. The CPU 78 may also send an out-of-band message via control link 52 to the speech recognition system 46 identifying the application state, including information such as who is calling, the menu the caller is at, and valid commands available for that particular instance. Preferably, the speech recognition system contains a template including the full set of menu options or commands, and the control link message provides the speech recognition system with a code indicating simply what subset of the menu options or commands are valid for that particular instance. It will be appreciated by those skilled in the art and others that the number of out-of-band messages relaying information such as that described above may vary.

In the meantime, the caller hears audio prompts which are intended to elicit a voice response and which are provided and played by the voice messaging system 44 pursuant to the optimized voice-navigable messaging application running thereon. In response, the caller provides spoken input, such as the words "change greeting." Pursuant to the optimized voice-navigable messaging application of this embodiment, this spoken input, when interpreted as described below, is designed to complete a task in one step and, thus, tasks that previously took multiple steps (and hence key presses and menus) in the key-based interface are redesigned to be a single step in this voice-activated interface.

The speech recognition system 46 in return receives and interprets the caller's spoken response based in part on the application state information provided by the voice messaging system 44. The interpretation of the caller's spoken response involves correlating the spoken response with a command recognizable by the voice messaging system 44. For example, if a caller wants to delete a message, he may say "trash bin," "erase," "delete it," or "delete the message." The speech recognition system identifies the provided response and then interprets it based on the given state of the application. For example, the speech recognition system may determine that "trash bin" maps to a "delete message" command.

In some embodiments, a single command may correspond to a number of actions to be carried out by the voice messaging system.

If the speech recognition system 46 cannot understand the caller, it will ask for the information again via the voice channel and then pass the information back to the voice messaging system via the control link 52 between network interface blocks 86 and 94. The speech recognition system 46 alone controls this type of error handling via an application preferably stored in memory of the CPU 88.

Once the caller's response is interpreted, the speech recognition system 46 sends at least one out-of-band protocol message back to the voice messaging system 44 via the control link 52 to communicate the command corresponding to the caller's response. The voice messaging system 44 then utilizes the identified command to further process the call pursuant to the optimized voice-navigable messaging application and/or to perform the at least one task/action associated with the command. For example, pursuant to a "change greeting" command, the voice messaging system 44 may request that the caller record a new greeting. The speech recognition system 46 is utilized again as described above if a further spoken response needs to be identified and interpreted. In this regard, because the speech recognition system is only utilized on an "as needed" basis in this embodiment, the audio connection between the caller and speech recognition is released at any point after the first spoken response is interpreted and provided to the voice messaging system. Thus, in this example, the audio connection must be reestablished for receipt of any subsequent spoken responses.

In a second embodiment of the present invention, the voice messaging system 44 essentially passes control of a call to the speech recognition system 46 asking it to run a voice-navigable messaging application, which in this embodiment resides on the speech recognition system. The voice messaging system 44, however, still initially handles a call in the sense that it answers the call and connects the caller to the speech recognition system 46 which thereafter controls the processing of the call. As will be further described below, this effectively means that the voice messaging system 44 generally goes "passive" as far as "talking" to the caller for the entire caller session. The voice messaging system 44 essentially acts as a switch and database server in this embodiment.

In particular, in the second embodiment, a caller is connected to the speech recognition system 46 via the voice messaging system 44 over the voice channel 50 pursuant to at least one out-of-band message sent over the control link 52 as similarly described above in reference to the first embodiment. However, once the caller is connected, the voice messaging system 44 stops actively interacting with the caller. Instead, the speech recognition system takes over processing of the call pursuant to the voice-navigable messaging application running thereon. Thus, in this embodiment, it is the speech recognition system 46 that provides prompts to the caller and generates any other audio that a caller may hear during a call. The speech recognition system 46 accesses the voice messaging system 44 simply as needed for the retrieval, storage, or deletion of information. In particular, when necessary, the speech recognition system 46 sends at least one out-of-band message via control link 52 to the voice messaging system 44 requesting, for example, the retrieval of a first message from the voice messaging system's storage device 82. The voice messaging system 44, in return, sends the first message back to the speech recognition system 46 via at least one out-of-band protocol message over control link 52. Then, the speech recognition system 46 plays the first message to the caller via the voice channel 50. In this case, it is the telephony interface 90 which is generating the audio that the caller is hearing; whereas in the first embodiment, the voice messaging system 44 performs all the requested tasks, such as playing messages to callers, deleting messages, etc., and the speech recognition system 46 is only used to identify a caller's spoken response and interpret the spoken response by correlating it to a command as requested by the voice messaging system 44.

In sum, in the first embodiment described above, the interaction with the caller switches back and forth between the voice messaging and speech recognition systems. Specifically, in the first architecture, the speech recognition system 46 interprets the caller's spoken response and provides the voice messaging system 44 (via out-of-band protocol messages over control link 52) with the corresponding command so that the voice messaging system can take the appropriate action (play a prompt, delete a message, play a message, etc.). However, in the second embodiment, the speech recognition system 46 performs the requested actions, and the voice messaging system 44 acts as a switch and database server, providing items to the speech recognition system 46 over the LAN control link 52 as requested. The basic architecture of the voice navigation system 40 remains the same for both embodiments, but the functionality differs.

Figure 4:
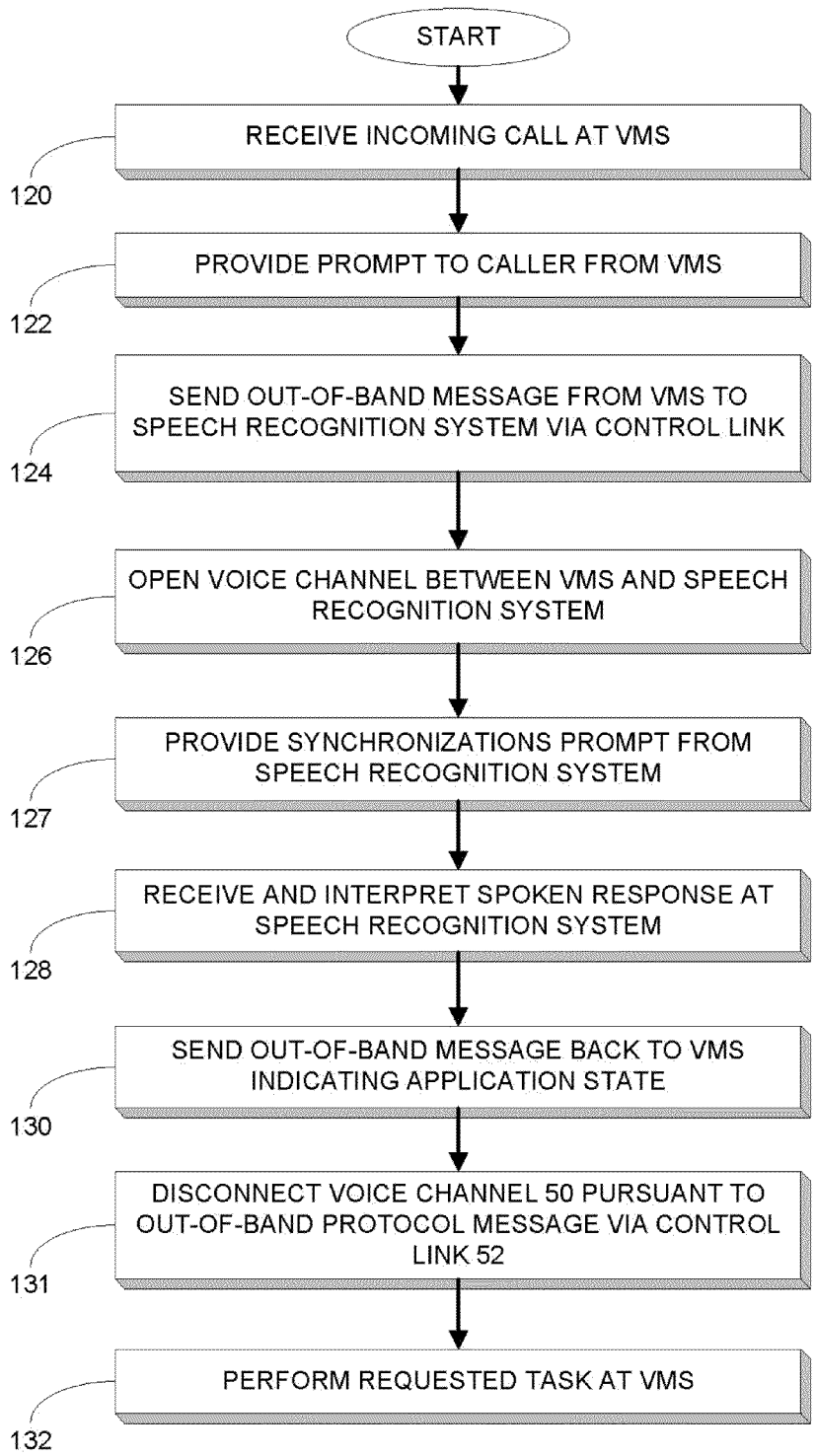
FIG. 4 is a flow chart illustrating the processing of a call in accordance with a first embodiment of the present invention.

FIG. 4 illustrates a flow diagram of the first embodiment of the present invention in which the voice messaging system 44 controls the entire processing of a call. First, at a block 120, the voice messaging system 44 receives an incoming call via a DID card 70. The voice messaging system 44 provides prompts to the caller eliciting a spoken response at a block 122. Then, at a block 124, the voice messaging system 44 sends at least one out-of-band message to the speech recognition system 46 via control link 52 to indicate that voice channel 50 should be opened between the voice messaging system 44 and the speech recognition system 46. In response, at a block 126, the voice channel 50 is opened between the caller and the speech recognition system 46 via the voice messaging system 44. Either as a part of the out-of-band message provided at block 124 or in another out-of-band protocol message sent via control link 52 at anytime thereafter, the voice messaging system 44 instructs the speech recognition system 46 to receive a spoken response from a caller via the voice channel 50 and provides the speech recognition system 46 with application state information, such as which menu the caller is at and which commands are valid for that instance. Even further, the voice messaging system 44 via the same or another out-of-band message also requests that the speech recognition system 46 return application state information indicative of the caller's response.

Next, at a block 127, the speech recognition system 46 provides an audio cue or synchronization prompt to the caller via audio channel 50 which indicates it is ready to receive speech from the caller. This synchronization prompt is provided as a part of a mini-application running on the speech recognition system 46 to both prompt callers regarding readiness to receive speech and to perform any error handling such as request that the spoken response be repeated if it was unintelligible. Then, at a block 128, the speech recognition system 46 receives the spoken response from the caller via the voice channel 50 and thereafter interprets the spoken response by correlating it with a command which is recognizable by the voice messaging system. Upon processing the spoken response, the speech recognition system 46 sends at least one out-of-band message back to the voice messaging system 44 at block 130 indicating the application state, including the interpreted command. At this time, as shown at a block 131, the audio channel 50 is disconnected pursuant to at least one out-of-band protocol message sent from the voice messaging system 44 to the speech recognition system 46 via control link 52. As a result, the speech recognition system is freed up when it is not needed such that its resources are more efficiently used. Finally, the voice messaging system 44 performs the requested task at a block 132. If the optimized voice-navigable messaging application requires further responses from the caller, the speech recognition system 46 is accessed again as described above. Otherwise, the voice messaging system 44 performs the requested task and further processes or ends the call.

It will be appreciated by those skilled in the art and others that the providing of prompts at block 122 can alternatively occur simultaneously with or after the functions represented in blocks 124 and 126. Similarly, the disconnection of the audio channel at block 131 could alternatively occur at any time after a message is sent back to the voice messaging system regarding a caller's interpreted voice response at block 130 and particularly could occur after the function identified in block 132.

Figure 5:
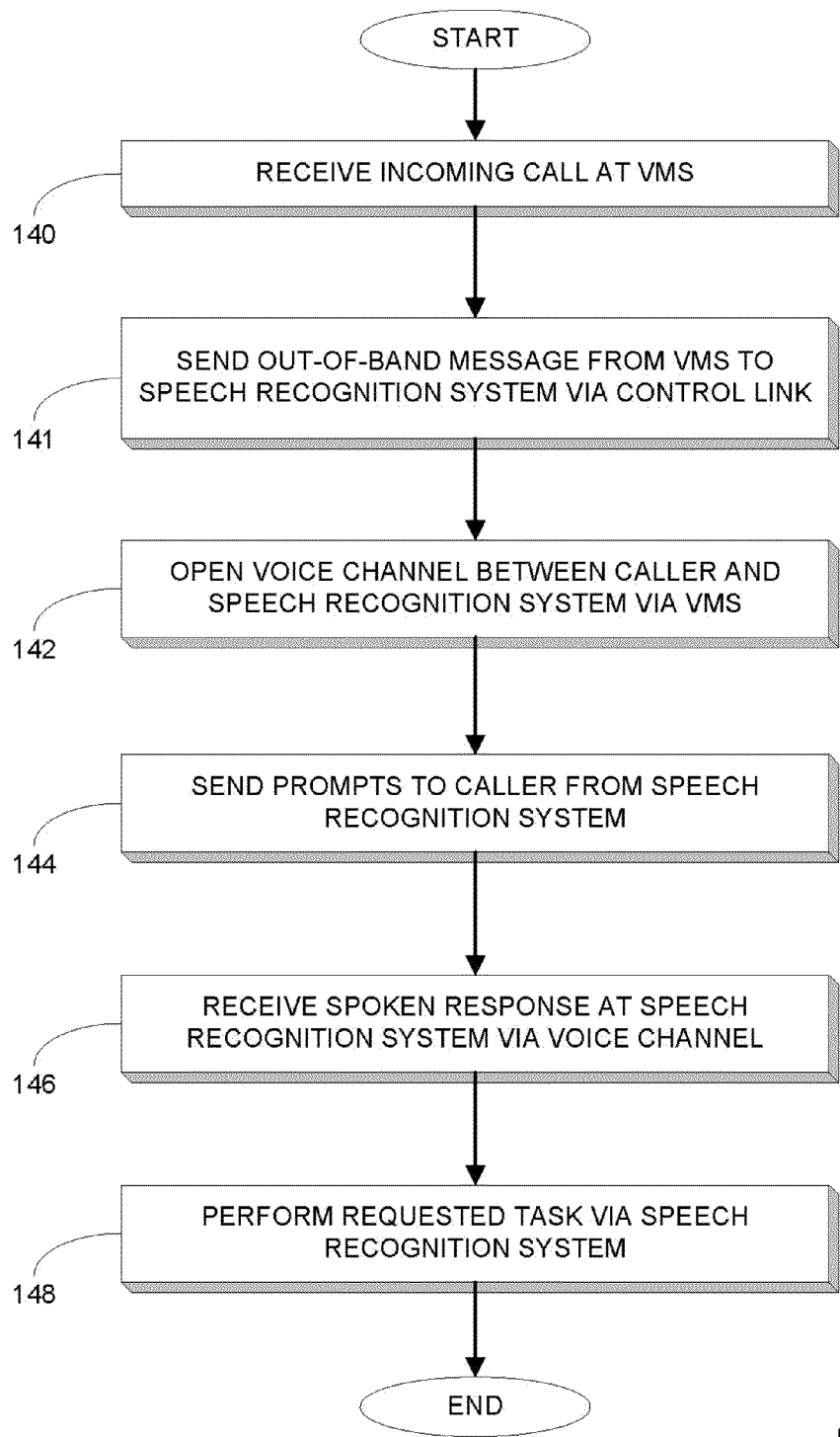
FIG. 5 is a flow chart illustrating the processing of a call in accordance with a second embodiment of the present invention.

FIG. 5 is a flow diagram illustrating the second embodiment of the present invention in which control of the call is essentially passed to the speech recognition system 46. Beginning at a block 140, the voice messaging system 44 receives an incoming call from a caller via a DID card 70. Then, at a block 141, the voice messaging system 44 sends at least one out-of-band message to the speech recognition system 46 via control link 52 to indicate that a caller is "on-line" and/or that voice channel 50 should be opened. In response, at a block 142, voice channel 50 is opened between the voice messaging system 44 and the speech recognition system 46 in order to provide an audio path to the caller. In this embodiment, the speech recognition system 46 sends a prompt to the caller from its telephony interface 90 via the voice channel 50. See block 144. Then, the speech recognition system 46 receives a spoken response from the caller via the voice channel 50. At block 148, the speech recognition system 46 performs the requested task and utilizes the voice messaging system 44 if necessary as further described below.

In this second embodiment, the voice-navigable messaging application on the speech recognition system is designed to be voice centric in that it does not have to follow a specific menu structure or procedural path during processing, but instead is more flexible because it can respond to a caller's commands outside of a menu-structured scheme. Thus, the speech recognition system 46 can be more reactive to a caller's desired tasks or actions. For example, a caller can simply request that "I want to send a message to John," rather than be required to follow a procedural path that requires the caller to indicate he wants to record a message, record the message, address the message, provide any further options, and finally approve that the message be sent.

Figure 6:
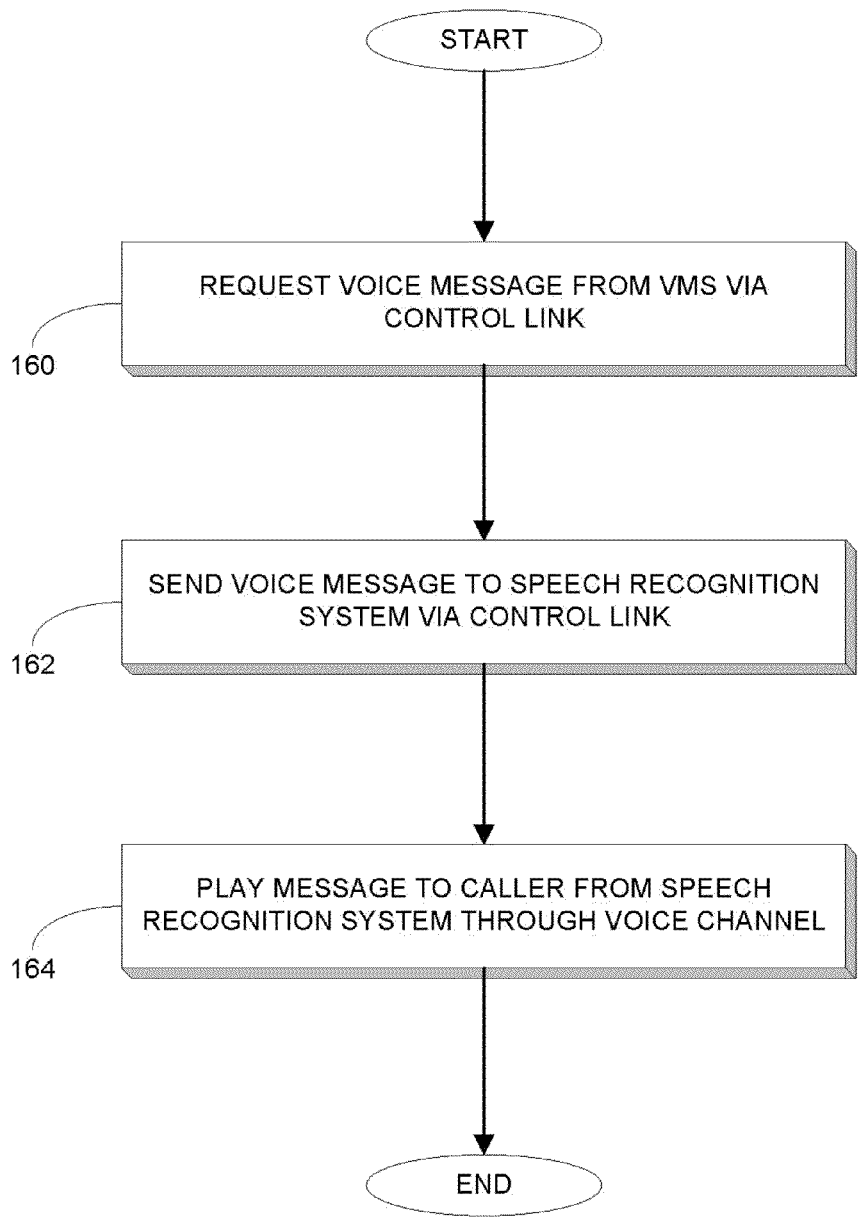
FIG. 6 is a flow chart illustrating the steps of retrieving a voice mail message in accordance with the second embodiment of the present invention illustrated in FIG. 5.

FIG. 6 is a flow diagram illustrating an example of how the speech recognition system 46 in the second embodiment of the present invention utilizes the voice messaging system 44 as a database. First, at a block 160, the speech recognition system 46 requests a voice message from the voice messaging system 44 via the LAN control link 52. Then, at a block 162, the voice messaging system 44 retrieves the requested voice message and sends it, via at least one out-of-band messaging protocol, to the speech recognition system 46 over the control link 52. Finally, at block 164, the speech recognition system 46 plays the message to the caller over the voice channel 50.

Figure 7:
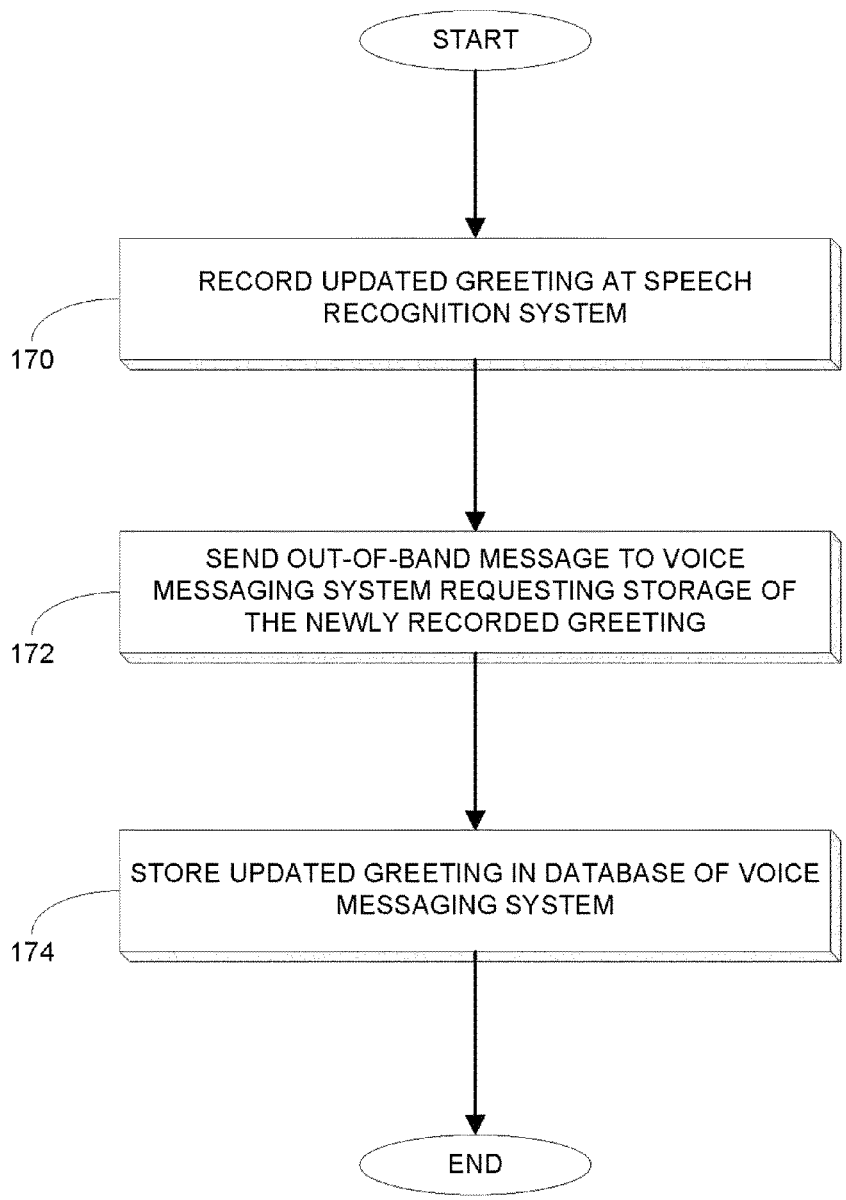
FIG. 7 is a flow chart illustrating the steps involved in recording a new greeting in accordance with the second embodiment of the present invention illustrated in FIG. 5.

FIG. 7 is a flow diagram illustrating another example of how the speech recognition system 46 in the second embodiment of the present invention utilizes the voice messaging system 44. First, at a block 170, the speech recognition system 46 records an updated greeting for a subscriber mailbox from the subscriber as provided via audio channel 50. Next, at a block 172, the speech recognition system 46 sends at least one out-of-band message via control link 52 to the voice messaging system 44 requesting that it store the new greeting. This out-of-band message may be quite large because it contains the greeting. However, it will be appreciated by those of ordinary skill in the art and others that the storage request and greeting may be sent to the voice messaging system 44 using more than one out-of-band message via control link 52. In response to this request, at a block 174, the CPU 78 stores the updated greeting in the database of the voice messaging system 44 for future use.

As described above with respect to FIGS. 6 and 7, the voice messaging system 44 serves as a database in the second embodiment of the present invention. FIGS. 6 and 7 are provided for exemplary purposes, and it will be appreciated by those skilled in the art and others that the voice message system can be requested (via an out-of-band message over control link 52) to retrieve, store, or delete any kind of information such as a message, greeting, or spoken subscriber name. It will further be appreciated that in the second embodiment, the voice channel 50 remains open during the entire processing of each individual call and, hence, is preferably closed at the end of an individual call.

While illustrative embodiments of the invention have been illustrated and described, it will be appreciated that various changes can be made therein without departing from the spirit and scope of the invention.

What is claimed is:

1. A voice-controlled messaging system comprising:
 a voice messaging system comprising an interface to a Public Switched Telephone Network (PSTN), a processor and a data storage component; and
 a stand-alone speech recognition system coupled to the voice messaging system via a control link and comprising a speech recognition application and a voice-navigable messaging application, the control link providing a communications pathway for out-of-band TCP/IP messages between the voice messaging system and the stand alone speech recognition system;
 wherein the voice messaging system is interfaced to the PSTN and is configured to:
  receive an incoming call from an originating point, via the PSTN interface;
  send a first out-of-band message over the control link, via a TCP/IP protocol, to the stand-alone speech recognition system providing call setup data and requesting that an audio path between the stand-alone speech recognition system and the voice messaging system be opened;
  pass control of the incoming call, via the audio path, to the stand-alone speech recognition system; and
  receive, via the control link, a second out-of-band TCP/IP message from the stand-alone speech recognition system; and
 wherein the stand-alone speech recognition system is configured to:
  receive the first out-of-band TCP/IP message from the voice messaging system;
  open the audio path;
  receive control of the incoming call;
  elicit a voice response from the originating point;
  receive and interpret the voice response via the speech recognition application;

correlate the voice response interpretation to an executable command of the voice-navigable messaging application;

provide the executable command to the voice-navigable messaging application such that the incoming call is processed; and send, via the control link, the second out-of-band TCP/IP message, which comprises an executable command, to the voice messaging system.

2. The system of claim 1, wherein the executable command comprised within the second out-of-band TCP/IP message causes the voice message system processor to retrieve data from the storage component and provide the data to the stand-alone speech recognition system via the control link.

3. The system of claim 2, wherein the stand-alone speech recognition system provides the retrieved data to the originating point via the audio path.

4. The system of claim 1, wherein the second out-of-band TCP/IP message further comprises data to be stored on the storage component of the voice messaging system and the executable command serves to instruct the processor to store said data on said storage component.

5. The system of claim 1, wherein the executable command comprised within the second out-of-band TCP/IP message causes the voice message system processor to delete data from the storage component.

* * * * *